United States Patent [19]

Solomon

[11] Patent Number: 5,329,275
[45] Date of Patent: Jul. 12, 1994

[54] MODULAR VIDEO SUBSYSTEM PARTITIONING INTERFACE

[75] Inventor: Gary Solomon, Hillsboro, Oreg.

[73] Assignee: Intel Corporation, Santa Clara, Calif.

[21] Appl. No.: 25,826

[22] Filed: Mar. 3, 1993

Related U.S. Application Data

[63] Continuation of Ser. No. 720,024, Jun. 24, 1991, abandoned.

[51] Int. Cl.⁵ .............................................. H05K 7/06
[52] U.S. Cl. ............................... 340/825.22; 361/684
[58] Field of Search .......................... 340/825.22, 811; 361/331, 346, 352, 356, 358, 380, 392, 395, 400

[56] References Cited

U.S. PATENT DOCUMENTS 5,097,388  3/1992  Buist et al. ........................ 361/392

Primary Examiner—Donald J. Yusko
Assistant Examiner—John E. Giust
Attorney, Agent, or Firm—Blakely, Sokoloff, Taylor & Zafman

[57] ABSTRACT

A standard interface between a system motherboard and a control card that can operate different types of screens, including LCD and VGA monitors. The interface has a plurality of pins each designated to a particular signal or power line. The signals and power provided by the interface allow the design of a control card that can drive any type of monitor or LCD screen.

20 Claims, 1 Drawing Sheet

MODULAR VIDEO SUBSYSTEM PARTITIONING INTERFACE

This is a continuation of U.S. application Ser. No. 07/720,024 filed Jun. 24, 1991, now abandoned.

BACKGROUND OF THE INVENTION

1. Field of the Invention

The present invention relates to a video screen control card interface between the card and a computer, that provides the signals and power to drive a variety of screen modes.

2. Description of Related Art

Present computers typically have a main system that is attached to peripheral devices such as a viewing screen that displays graphic images. Graphics display subsystems are designed with a wide variety of mode standards including VGA, EGA, and CGA. Monitors which support each individual standard have different power and signal requirements. The advent of Liquid Crystal Display (LCD) screens introduce a viewing device which requires yet another set of signals and power.

Present systems typically have a control card that is attached to a motherboard to drive the screen. For a user to switch monitors, for example replacing a VGA monitor with an EGA monitor, the user must change the system software or monitor with an EGA monitor or insert a new control card. Such procedures are time consuming and add to the complexity of the computer. One possible solution is to provide a control card for each type of screen that could be used. Such a system would be heavy and bulky, and would not be desirable for a portable computer such as a laptop.

It would therefore be desirable to have a single control card that would allow the user to plug in and use various types of screens without having to change any software or hardware in the computer. Such a card would require a standard interface between the system and the card, so that a single control card can interface with a variety of screen modes. It would be particularly useful to have a standard interface that would allow the computer to plug into either a VGA monitor or LCD screen through one control card.

SUMMARY OF THE INVENTION

The present invention is a standard interface between a system motherboard and a control card that can operate different types of screens, including LCD screens and VGA monitors. The interface has a plurality of pins each designated to a particular signal or power line. The signals and power provided by the interface, allow the design of a control card that can drive any type of monitor or LCD screen.

The control card may have two or more ports so that the computer can operate with any type of screen. For example, the computer may be a laptop with ports for both a LCD screen and a VGA monitor. A user may operate the computer with the LCD screen when space requires a laptop, and then plug the computer into a VGA monitor which generally have greater color graphic capabilities. The interface passes information to the system motherboard via a simple mechanical switch, wherein the user can jump from one screen to the other by merely flipping the switch. The card allows the user to utilize both a LCD screen and a VGA monitor without having to change control cards or the system software as required in the prior art.

Therefore it is an object of this invention to provide an interface between a system motherboard and a video control card, that allows the control card to be designed to operate any type of screen.

It is also an object of this invention to provide an interface between a system motherboard and a video control card, that allows the control card to operate both LCD and monitor viewing screens.

It is also an object of this invention to provide a standard interface between a system motherboard and a video control card.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
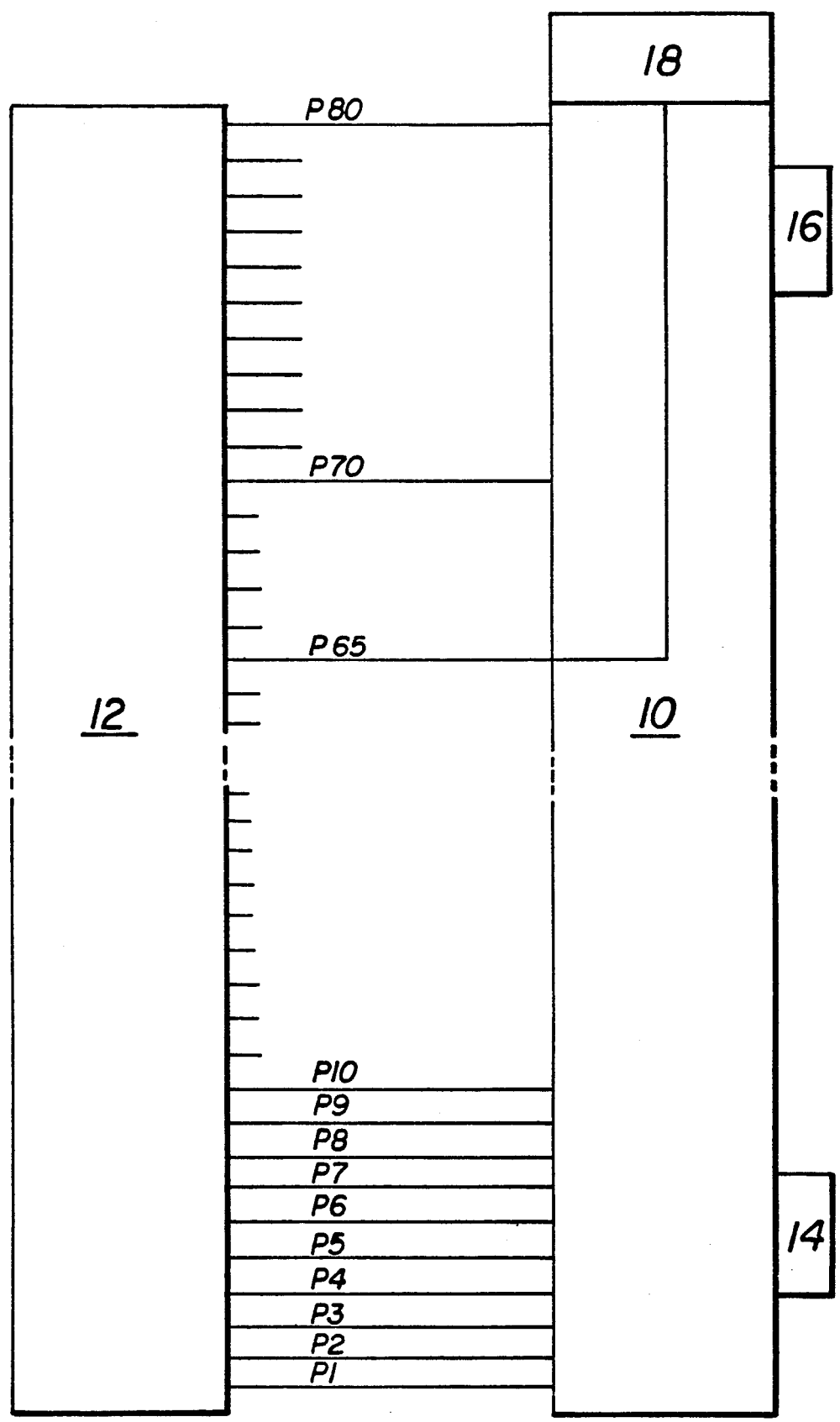
FIG. 1 is a schematic drawing of an interface between a motherboard and a control card of the present invention.

Referring to the drawing more particularly by reference number, FIG. 1 shows a control card 10 that can be attached to a system motherboard 12. The motherboard 12 is part of a main computer system that provides signals, power and data to the control card 10. The card 10 itself may also generate signals and data to be transmitted to the system 12. The control card 10 may have connector ports 14 and 16 that can be connected to various viewing screens (not shown). The card 10 may be designed such that a LCD screen can be attached to and operated through port 14, and a VGA monitor can be attached to and operated through port 16. The control card 10 can thus operate both a LCD screen and a VGA monitor. Although a control card 10 with two ports that connect the card 10 to a LCD screen and VGA monitor are described, it is to be understood that the card 10 can be designed with any number of ports that can be connected to any type of viewing screen, including but not limited to Super VGA, EGA, CGA and Hercules monitors. In the preferred embodiment, the control card 10 has a 6 pin connector and a 15 pin connector for a Mono Flat Panel LCD screen and a 15 pin connector for a VGA monitor.

The control card 10 preferably has a standardized interface between the card 10 and motherboard 12, so that the card 10 can be attached to the computer no matter what type of screen is connected to the card 10. For instance, the card can be designed to be connected to both a VGA and EGA monitor, or a LCD screen and a VGA monitor and so forth and so on. The interface of the present invention provides signals and power between the card 10 and computer 12 so that the card 10 can be designed to drive any type of screen without having to change the system 12 configuration. In the preferred embodiment the interface is defined by pins P1-P80 as shown in FIG. 1. The pins are preferably assigned a designated signal, or power as follows:

P1 provides access to a 16 bit memory access signal generated by the card 10, which is an output from the card 10 to the motherboard 12 to indicate to the system 12 that the card 10 is capable of accepting and transmitting memory information in 16 bits (2 bytes) instead of 8 bits (1 byte).

P2 provides access to a buffer address latch enable signal generated by the system 12, which is a clock pulse for the unlatched address bits which are to be subsequently described.

P3 provides access to a system high byte enable signal generated by the system 12, which indicates to the card 10 whether there is valid data on the high byte data bus which is to be subsequently described.

P4 provides access to a address enable signal generated by the system 12, which indicates when a direct memory access (DMA) controller is driving the address bus instead of a central process unit (CPU).

P5 provides access to a monitor interrupt request signal generated by the card 10, which indicates to the system 12 when the raster of a monitor is in the video down position (raster reaches the bottom of the screen) so that the video memory may be updated. The use of this pin is optional depending upon whether the system is designed to read and/or write video memory when the raster reaches the bottom of the screen.

P6 provides access to an input/output (I/O) cycle ready signal generated by the card 10, which indicates to the system 12 that an I/O cycle can complete successfully.

P7 provides access to a reset signal generated by the system 12, which causes the card 10 to initialize itself.

P8 provides access to an I/O write strobe signal generated by the system 12, which provides a write strobe to the card 10 so that I/O write data can be written into the card 10, provided that the I/O port resides on the card 10.

P9 provides access to an I/O read strobe signal generated by the system 12, which provides a read strobe to the card 10 so that the system 12 can read I/O data from the card 10, provided that the I/O port resides on the card 10.

P10 provides access to a memory read signal generated by the system 12, which provides a read strobe to the card 10 so that the system 12 can read memory data from the card 10, provided that the memory location resides on the card 10.

P11 provides access to a memory write signal generated by the system 12, which provides a write strobe to the card 10 so that memory write data can be written into the card 10, provided that the memory location resides on the card 10.

P12 provides access to system memory refresh signal generated by the system 12, which indicates to the card 10 that main memory refresh is in process.

P13 provides access to a second low power control signal generated by the system 12, which indicates when the system 12 is not being used. This signal can be used conjunctively with a first low power control signal (P67) to jointly control a LCD flat panel back light, drive voltage and control/data signal.

P14 provides access to a 16 bit I/O access signal generated by the card 10, which is an output from the card 10 to the motherboard 12 to indicate to the system 12 that the card 10 is capable of accepting and transmitting I/O information in 16 bits (2 bytes) instead of 8 bits (1 byte).

P15, P17-P18, P27, P30, P40, P53, P64 and P74-P80 provide access to digital signal ground.

P16 provides access to a bus clock signal generated by the system 12. The bus clock signal is the system 12 clock that is preferably fixed at a frequency of 14.318 MHz.

P19-P26 provide access to a high byte data bus between the system 12 and card 10 which provide bits 8-15 for both I/O and memory.

P28-P29, P39 and P51-P52 provide access to +5 volt power supplied by the system 12 to the card 10.

P31-P38 provide access to a low byte data bus between the system 12 and card 10 which provide bits 0-7 for both I/O and memory.

P41-P43 provide access to 3 unlatched address bit signals generated by the system 12 and preferable designated as bits 19-17, respectively.

P44-P50 provide access to 7 latched address bit signals, generated by the system 12 and preferably designated as bits 16-10, respectively.

P54-P63 provide access to 10 latched address bit signals, generated by the system 12 and preferably designated 20 as bits 9-0, respectively.

P65 provides access to an active display signal generated by a mechanical switch 18 preferable physically located on the card 10. The switch can be moved by the user such that the active display signal indicates to the system 12 what type of screen is to be viewed by the user. For example, a LCD screen and VGA monitor might both be attached to the card 10. The system 12 provides information to the card 10 in accordance with the status of the active display signal. If the user wants to view the LCD he may turn the switch one way which informs the system 12 to provide information that is compatible with an LCD screen. If the user wants to view the VGA monitor he may turn the switch the other way he informs wherein the system 12 to provide information that is compatible with the VGA monitor. The switch allows the screens to be switched without any change in the system software as is required in the prior art.

P66 provides access to a video memory address decode signal which indicates a request from the system 12 to the card 10 for memory addresses preferably designated A0000-BFFFF in the video memory address space.

P67 provides access to a first low power control signal which indicates when the system is not being used. This pin is used in systems with power control management. The signal is operatively connected to the back light of a screen, wherein the light is turned down or off if a user does not use the keyboard during a predetermined amount of time. This pin allows the use of power control management, which preserves the energy of the computer batteries.

P68 provides access to a −24 volt power supply from the system 12 to the card 10. The −24 volts of power is typically used to power monochrome LCD screens when in normal on conditions.

P69 provides access to a +12 volt power supply from the system 12 to the card 10. The +12 volts of power is typically used to power a color LCD screen.

P70 provides access to a +14.4 volt power supply from the system 12 to the card 10. The +14.4 volt power is typically used to power the backlight of a color LCD screen.

P71 provides access to a video control powerdown signal generated by the system 12, which when activated puts the video controller in a power down mode.

P72 provides access to a TFT strobe signal generated by the system 12, which provides a handshake for data from the system 12 to the card 10 for a color LCD. This pin is optional depending upon whether a color LCD is connected to the system 12.

P73 provides access to a TFT data signal which provides data for a card 10 when using a color LCD. This pin is optional depending upon whether a color LCD is connected to the system 12.

Thus what is described is an interface that provides the necessary signals and power for a control card that can operate any type of LCD screen or monitor. The interface also allows the incorporation of a power management system, which is particularly useful in laptop computers powered by batteries. In the preferred embodiment the power management system is incorporated with a LCD screen in the following manner.

When P13 and P67 are both active the backlight of the LCD screen is turned off, the drive voltage of the LCD (−24 volts) is turned off and the LCD pixel data and control lines are turned off.

When P13 is inactive and P67 is active, the backlight is turned off and the drive voltage and pixel lines are still on.

When P13 is active and P67 is inactive, the backlight is of medium intensity and the drive voltage and pixel lines are still on.

When P13 and P67 are both inactive, the backlight is of high intensity and the drive voltage and pixel lines are still on.

When the second low power control signal (P67) is used alone, the backlight turns off when the power control signal (P67) is active, and on when the power control signal (P67) is inactive.

While certain exemplary embodiments have been described in detail and shown in the accompanying drawing it is to be understood that such embodiments are merely illustrative of and not restrictive on the broad invention, and that this invention not be limited to the specific arrangements and constructions shown and described, since various other modifications may occur to those ordinarily skilled in the art.

What is claimed is:

1. A video screen control card that connects at least one type of video screen to a computer system, wherein the interface between the control card and system comprises;

at least one pin that provides access to a signal generated by the control card, which indicates to the system that the control card accepts memory in 16 bits;
   at least one pin that provides access to a signal generated by the control card, which indicates to the system that the card accepts I/O in 16 bits;
   at least one pin that provides access to a high byte enable signal generated by the system;
   at least one pin that provides access to a direct memory access enable signal generated by the system;
   at least one pin that provides access to an I/O ready signal generated by the control card;
   at least one pin that provides access to a system reset signal generated by the system;
   at least one pin that provides access to an I/O write strobe signal generated by the system;
   at least one pin that provides access to an I/O read strobe signal generated by the system;
   at least one pin that provides access to a memory read strobe signal generated by the system;
   at least one pin that provides access to a memory write strobe signal generated by the system;
   at least one pin that provides access to a memory refresh signal generated by the system;
   at least one pin that provides access to a system clock signal generated by the system;
   at least one pin that provides access to a high byte data bus;
   at least one pin that provides access to a low byte data bus;
   at least one pin that provides access to at least one unlatched address bit signal generated by the system;
   at least one pin that provides access to at least one latched address bit signal generated by the system;
   at least one pin that provides access to a clock signal generated by the system for said unlatched address bit;
   at least one pin that provides access to an active display signal generated by the control card that indicates which screen type is operatively connected to the system;
   at least one pin that provides access to a signal generated by the system that request memory addresses in the control card memory;
   at least one pin that provides access to a monitor control powerdown signal generated by the system;
   at least one pin that provides access to a power supply from the system having a first predetermined voltage;
   at least one pin that provides access to a power supply from the system having a second predetermined voltage;
   at least one pin that provides access to a power supply from the system having a third predetermined voltage;
   at least one pin that provides access to a power supply from the system having a fourth predetermined voltage; and,
   at least one pin that provides access to ground.

2. The interface as recited in claim 1, further comprising at least one pin that provides access to a first low power control signal generated by the system.

3. The interface as recited in claim 2, wherein the screen has a backlight and the backlight is turned on when said first low power control signal is inactive and the backlight is turned off when said first low power control signal is active.

4. The interface as recited in claim 2, further comprising at least one pin that provides access to a second low power control signal generated by the system.

5. The interface as recited in claim 4, wherein the screen has a backlight, the backlight and second predetermined voltage are both off when both said first and second low power control signals are active, the backlight is off and said second predetermined voltage is on when said first low power control signal is inactive and said second low power control signal is active, the backlight is on medium intensity and said second predetermined voltage is on when said first low power control signal is active and said second low power control signal is inactive, the backlight is on high intensity and said second predetermined voltage is on when both said first and second low power control signals are inactive.

6. The interface as recited in claim 1, wherein said active display signal is connected to a mechanical switch.

7. The interface as recited in claim 1, further comprising at least one pin that provides access to a LCD data strobe generated by the system and at least one pin that provides access to a LCD data bus.

8. The interface as recited in claim 1, wherein said first predetermined voltage is +5 volts, said second predetermined voltage is −24 volts, said third predetermined voltage is +12 volts and said fourth predetermined voltage is +14.4 volts.

9. An interface for a video screen control card that connects at least one type of video screen to a computer system, wherein the interface between the control card and system comprises;
   at least one pin that provides access to a signal generated by the control card, which indicates to the system that the control card accepts memory in 16 bits;
   at least one pin that provides access to a signal generated by the control card, which indicates to the system that the card accepts I/O in 16 bits;
   at least one pin that provides access to a high byte enable signal generated by the system;
   at least one pin that provides access to a direct memory access enable signal generated by the system;
   at least one pin that provides access to an I/O ready signal generated by the control card;
   at least one pin that provides access to a monitor interrupt request signal generated by the control card;
   at least one pin that provides access to a system reset signal generated by the system;
   at least one pin that provides access to an I/O write strobe signal generated by the system;
   at least one pin that provides access to an I/O read strobe signal generated by the system;
   at least one pin that provides access to a memory read strobe signal generated by the system;
   at least one pin that provides access to a memory write strobe signal generated by the system;
   at least one pin that provides access to a memory refresh signal generated by the system;
   at least one pin that provides access to a first low power control signal generated by the system;
   at least one pin that provides access to a system clock signal generated by the system;
   at least one pin that provides access to a high byte data bus;
   at least one pin that provides access to a low byte data bus;
   at least one pin that provides access to at least one unlatched address bit signal generated by the system;
   at least one pin that provides access to at least one latched address bit signal generated by the system;
   at least one pin that provides access to a clock signal generated by the system for said unlatched address bit;
   at least one pin that provides access to an active display signal generated by the control card that indicates which screen type is operatively connected to the system;
   at least one pin that provides access to a signal generated by the system that request memory addresses in the control card memory;
   at least one pin that provides access to a second low power control signal generated by the system;
   at least one pin that provides access to a monitor control powerdown signal generated by the system;
   at least one pin that provides access to a power supply from the system having a first predetermined voltage;
   at least one pin that provides access to a power supply from the system having a second predetermined voltage;
   at least one pin that provides access to a power supply from the system having a third predetermined voltage;
   at least one pin that provides access to a power supply from the system having a fourth predetermined voltage;
   at least one pin that provides access to ground;
   at least one pin that provides access to a LCD data strobe signal generated by the system; and,
   at least one pin that provides access to a LCD data bus.

10. The interface as recited in claim 9, wherein the screen has a backlight, the backlight and second predetermined voltage are both off when both said first and second low power control signals are active, the backlight is off and said second predetermined voltage is on when said first low power control signal is inactive and said second low power control signal is active, the backlight is on medium intensity and said second predetermined voltage is on when said first low power control signal is active and said second low power control signal is inactive, the backlight is on high intensity and said second predetermined voltage is on when both said first and second low power control signals are inactive.

11. The interface as recited in claim 9, wherein said first predetermined voltage is +5 volts, said second predetermined voltage is −24 volts, said third predetermined voltage is +12 volts and said fourth predetermined voltage is +14.4 volts.

12. An interface for a control card connected to a computer system, wherein the control card has an output port for a video monitor screen and an output port for a LCD screen, wherein the interface between the control card and system comprises;
   at least one pin that provides access to a signal generated by the control card, which indicates to the system that the control card accepts memory in 16 bits;
   at least one pin that provides access to a signal generated by the control card, which indicates to the system that the card accepts I/O in 16 bits;
   at least one pin that provides access to a high byte enable signal generated by the system;
   at least one pin that provides access to a direct memory access enable signal generated by the system;
   at least one pin that provides access to a monitor interrupt request signal generated by the control card;
   at least one pin that provides access to a system reset signal generated by the system;
   at least one pin that provides access to an I/O write strobe signal generated by the system;
   at least one pin that provides access to an I/O read strobe signal generated by the system;
   at least one pin that provides access to a memory read strobe signal generated by the system;
   at least one pin that provides access to a memory write strobe signal generated by the system;
   at least one pin that provides access to a first low power control signal generated by the system;
   at least one pin that provides access to a memory refresh signal generated by the system;

at least one pin that provides access to a system clock signal generated by the system;

at least one pin that provides access to a high byte data bus;

at least one pin that provides access to a low byte data bus;

at least one pin that provides access to at least one unlatched address bit signal generated by the system;

at least one pin that provides access to at least one latched address bit signal generated by the system;

at least one pin that provides access to a clock signal generated by the system for said unlatched address bit;

at least one pin that provides access to an active display signal generated by the control card that indicates which screen type is operatively connected to the system;

at least one pin that provides access to a signal generated by the system that request memory addresses in the control card memory;

at least one pin that provides access to a second low power control signal generated by the system;

at least one pin that provides access to a monitor control powerdown signal generated by the system;

at least one pin that provides access to a power supply from the system having a first predetermined voltage;

at least one pin that provides access to a power supply from the system having a second predetermined voltage;

at least one pin that provides access to a power supply from the system having a third predetermined voltage;

at least one pin that provides access to a power supply from the system having a fourth predetermined voltage;

at least one pin that provides access to ground;

at least one pin that provides access to a LCD data strobe signal generated by the system; and, at least one pin that provides access to a LCD data bus.

13. The interface as recited in claim 12, wherein the screen has a backlight, the backlight and second predetermined voltage are both off when both said first and second low power control signals are active, the backlight is off and said second predetermined voltage is on when said first low power control signal is inactive and said second low power control signal is active, the backlight is on medium intensity and said second predetermined voltage is on when said first low power control signal is active and said second low power control signal is inactive, the backlight is on high intensity and said second predetermined voltage is on when both said first and second low power control signals are inactive.

14. The interface as recited in claim 12, wherein said first predetermined voltage is +5 volts, said second predetermined voltage is −24 volts, said third predetermined voltage is +12 volts and said fourth predetermined voltage is +14.4 volts.

15. An interface for a video screen control card that connects at least one type of video screen to a computer system, wherein the interface between the control card and system comprises;

pin 1 which provides access to a signal generated by the control card which indicates to the system that the control card will accept memory in 16 bits;

pin 2 which provides access to a clock signal generated by the system for unlatched address bit signals;

pin 3 which provides access to a high byte enable signal generated by the system;

pin 4 which provides access to a direct memory access enable signal generated by the system;

pin 5 which provides access to a monitor interrupt request signal generated by the control card;

pin 6 which provides access to an I/O ready signal generated by the control card;

pin 7 which provides access to a system reset signal generated by the system;

pin 8 which provides access to an I/O write strobe signal generated by the system;

pin 9 which provides access to an I/O read strobe signal generated by the system;

pin 10 which provides access to a memory read strobe signal generated by the system;

pin 11 which provides access to a memory write strobe signal generated by the system;

pin 12 which provides access to a memory refresh signal generated by the system;

pin 13 which provides access to a second low power control signal;

pin 14 which provides access to a signal generated by the control card which indicates to the system that the control card will accept I/O in 16 bits;

pin 15 which provides access to ground;

pin 16 which provides access to a system clock signal generated by the system;

pins 17-18 which provide access to ground;

pins 19-26 which provide access to a high byte data bus between the system and the control card;

pin 27 which provides access to ground;

pins 28-29 which provide access to a +5 volt power supply from the system;

pin 30 which provides access to ground;

pins 31-38 which provide access to a low byte data bus;

pin 39 which provides access to a +5 volt power supply from the system;

pin 40 which provides access to ground;

pins 41-43 which provide access to 3 unlatched address bit signals generated by the system;

pins 44-50 which provide access to 7 latched address bit signals from the system;

pins 51-52 which provide access to a +5 volt power supply from the system;

pin 53 which provides access to ground;

pins 54-63 which provide access to 10 latched address bit signals generated by the system;

pin 64 which provides access to ground;

pin 65 which provides access to an active display signal generated by the control card that indicates which screen type is operatively connected to the system;

pin 66 which provides access to a signal generated by the system that request memory addresses in the control card memory;

pin 67 which provides access to a first low power control signal generated by the system;

pin 68 which provides access to a −24 volt power supply from the system;

pin 69 which provides access to a +12 volt power supply from the system;

pin 70 which provides access to a +14.4 volt power supply from the system;

pin 71 which provides access to a monitor control powerdown signal generated by the system;

pin 72 which provides access to a LCD data strobe generated by the system;

pin 73 which provides access to a LCD data bus between the system and control card; and, pins 74-80 which provide access to ground.

16. The interface as recited in claim 15, wherein the screen has a backlight, the backlight and second predetermined voltage are both off when both said first and second low power control signals are active, the backlight is off and said second predetermined voltage is on when said first low power control signal is inactive and said second low power control signal is active, the backlight is on medium intensity and said second predetermined voltage is on when said first low power control signal is active and said second low power control signal is inactive, the backlight is on high intensity and said second predetermined voltage is on when both said first and second low power control signals are inactive.

17. The interface as recited in claim 15, wherein said first predetermined voltage is +5 volts, said second predetermined voltage is −24 volts, said third predetermined voltage is +12 volts and said fourth predetermined voltage is +14.4 volts.

18. An interface for a control card connected to a computer system, wherein the control card has an output port for a video monitor screen and an output port for a LCD screen, wherein the interface between the control card and system comprises;

pin 1 which provides access to a signal generated by the control card which indicates to the system that the control card will accept memory in 16 bits;

pin 2 which provides access to a clock signal generated by the system for unlatched address bit signals;

pin 3 which provides access to a high byte enable signal generated by the system;

pin 4 which provides access to a direct memory access enable signal generated by the system;

pin 5 which provides access to a monitor interrupt request signal generated by the control card;

pin 6 which provides access to an I/O ready signal generated by the control card;

pin 7 which provides access to a system reset signal generated by the system;

pin 8 which provides access to an I/O write strobe signal generated by the system;

pin 9 which provides access to an I/O read strobe signal generated by the system;

pin 10 which provides access to a memory read strobe signal generated by the system;

pin 11 which provides access to a memory write strobe signal generated by the system;

pin 12 which provides access to a memory refresh signal generated by the system;

pin 13 which provides access to a second low power control signal;

pin 14 which provides access to a signal generated by the control card which indicates to the system that the control card will accept I/O in 16 bits;

pin 15 which provides access to ground;

pin 16 which provides access to a system clock signal generated by the system;

pins 17-18 which provide access to ground;

pins 19-26 which provide access to a high byte data bus between the system and the control card;

pin 27 which provides access to ground;

pins 28-29 which provide access to a +5 volt power supply from the system;

pin 30 which provides access to ground;

pins 31-38 which provide access to a low byte data bus;

pin 39 which provides access to a +5 volt power supply from the system;

pin 40 which provides access to ground;

pins 41-43 which provide access to 3 unlatched address bit signals generated by the system;

pins 44-50 which provide access to 7 latched address bit signals from the system;

pins 51-52 which provide access to a +5 volt power supply from the system;

pin 53 which provides access to ground;

pins 54-63 which provide access to 10 latched address bit signals generated by the system;

pin 64 which provides access to ground;

pin 65 which provides access to an active display signal generated by the control card that indicates which screen type is operatively connected to the system;

pin 66 which provides access to a signal generated by the system that request memory addresses in the control card memory;

pin 67 which provides access to a first low power control signal generated by the system;

pin 68 which provides access to a −24 volt power supply from the system;

pin 69 which provides access to a +12 volt power supply from the system;

pin 70 which provides access to a +14.4 volt power supply from the system;

pin 71 which provides access to a monitor control powerdown signal generated by the system;

pin 72 which provides access to a LCD data strobe generated by the system;

pin 73 which provides access to a LCD data bus between the system and control card; and, pins 74-80 which provide access to ground.

19. The interface as recited in claim 18, wherein the screen has a backlight, the backlight and second predetermined voltage are both off when both said first and second low power control signals are active, the backlight is off and said second predetermined voltage is on when said first low power control signal is inactive and said second low power control signal is active, the backlight is on medium intensity and said second predetermined voltage is on when said first low power control signal is active and said second low power control signal is inactive, the backlight is on high intensity and said second predetermined voltage is on when both said first and second low power control signals are inactive.

20. The interface as recited in claim 18, wherein said first predetermined voltage is +5 volts, said second predetermined voltage is −24 volts, said third predetermined voltage is +12 volts and said fourth predetermined voltage is +14.4 volts.

* * * * *

UNITED STATES PATENT AND TRADEMARK OFFICE
CERTIFICATE OF CORRECTION

PATENT NO. : 5,329,275
DATED : 7/12/94
INVENTOR(S) : Gary Solomon

It is certified that error appears in the above-indentified patent and that said Letters Patent is hereby corrected as shown below:

Column 5, line 41,  Delete "A";   Insert in place thereof --An interface for a --

Signed and Sealed this

Tenth Day of October, 1995

Attest:

BRUCE LEHMAN

Attesting Officer  Commissioner of Patents and Trademarks